US 6,545,455 B2

(12) United States Patent
Saito

(10) Patent No.: US 6,545,455 B2
(45) Date of Patent: Apr. 8, 2003

(54) UPSTREAM CHANNEL OVERLOAD DETECTION CIRCUIT AND BASE STATION APPARATUS

(75) Inventor: Atsushi Saito, Saitama (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/850,132

(22) Filed: May 8, 2001

(65) Prior Publication Data

US 2001/0043061 A1 Nov. 22, 2001

(30) Foreign Application Priority Data

May 11, 2000 (JP) ........................................ 2000-139118

(51) Int. Cl.[7] ............................................. G01R 13/20
(52) U.S. Cl. .................................... 324/76.26; 370/320
(58) Field of Search ............................. 324/76.26, 613, 324/614, 620, 225; 370/331, 335, 342, 320

(56) References Cited

U.S. PATENT DOCUMENTS

| 4,837,498 A | * | 6/1989 | Faulkner et al. ........... 324/57 N |
| 6,173,190 B1 | * | 1/2001 | Usui ........................... 455/562 |
| 6,363,262 B1 | * | 3/2002 | McNicol ...................... 455/561 |
| 6,404,778 B1 | * | 6/2002 | Hayashi et al. ............. 370/470 |

FOREIGN PATENT DOCUMENTS

| EP | 0 889 663 | 1/1999 |
| EP | 0 892 570 | 1/1999 |
| GB | 2 275 848 | 9/1994 |
| JP | 7-298336 | 11/1995 |
| WO | WO 98/24199 | 6/1998 |
| WO | WO 00/25548 | 5/2000 |

* cited by examiner

Primary Examiner—N. Le
Assistant Examiner—Etienne P Leroux
(74) Attorney, Agent, or Firm—Foley & Lardner

(57) ABSTRACT

An upstream channel overload detection circuit for a CDMA (Code Division Multiple Access) mobile communication system includes a reception electric field measurement section, noise level storage section, threshold storage section, and comparing section. The reception electric field measurement section detects the electric field strength levels of reception signals from a plurality of mobile terminals. The noise level storage section stores an output from the reception electric field measurement section as a noise level when there is no transmission power of the plurality of mobile terminals. The threshold storage section stores, as a threshold level, an output from the reception electric field measurement section which corresponds to an allowable number of transmissions from the plurality of mobile terminals. The comparing section compares the electric field strength level output from the reception electric field measurement section with a sum value obtained by adding the noise level stored in the noise level storage section to the threshold level stored in the threshold storage section. A base station apparatus is also disclosed.

9 Claims, 2 Drawing Sheets

UPSTREAM CHANNEL OVERLOAD DETECTION CIRCUIT AND BASE STATION APPARATUS

BACKGROUND OF THE INVENTION

The present invention relates to an upstream channel overload detection circuit for communication from a mobile station to a base station in a communication system based on a CDMA (Code Division Multiple Access) scheme used in a mobile communication system, and a base station apparatus for the system.

In a CDMA mobile communication system using spread spectrum codes, a service area is divided into a plurality of cells as unit areas, and one base station apparatus is installed in each cell. A mobile terminal existing in a cell of the service area communicates with a base station apparatus in the cell through a radio channel or simultaneously communicates with adjacent base station apparatuses in a plurality of cells. This mobile terminal further communicates from the base station apparatus to another mobile station, telephone set, or the like via another radio channel or communication line.

A mobile communication system like the one shown in FIG. 2 is disclosed in Japanese Patent Laid-Open No. 7-298336. Referring to FIG. 2, the mobile communication system is comprised of a mobile terminal 10 and base station apparatus 20. The mobile terminal 10 includes an antenna 11 for communication with the base station apparatus 20, a transmission circuit section 13 and reception circuit section 14 which are connected to the antenna 11 through a transmission/reception switch 12, a control section 15 connected to the transmission circuit section 13 and reception circuit section 14, and an reception/interference level detection section 16 for measuring the reception level of a perch channel and an interference level (corresponding to noise caused by mutual interference) contained in a reception level.

The control section 15 calculates a carrier to noise ratio (CNR) on the basis of the reception level and interference level detected by the reception/interference level detection section 16.

The reception/interference level detection section 16 is comprised of a correlation detection section 17, level detector 18, and interference detector 19. In the reception/interference level detection section 16, the output signal received by the reception circuit section 14 from the base station apparatus 20 in each cell over a perch channel from the base station apparatus 20 through the antenna 11 and transmission/reception switch 12 is supplied to the correlation detection section 17. The correlation detection section 17 sequentially detects the correlations between the perch channel designated by the control section 15 and level monitor spreading codes, and despreads the output signal from the reception circuit section 14 with the corresponding level monitor spreading code. The power spectrum obtained by this despreading is supplied to the level detector 18 and interference detector 19, which then measure a reception level and interference level, respectively. A CNR is calculated from this measurement result, and an optimal cell is selected.

The base station apparatus 20 includes a plurality of antennas 21 for communication with the mobile terminal 10, a base station amplifier (AMP) 26 connected to the antennas 21, a modulator/demodulator (TRX) 27 for demodulating a reception signal and modulating a transmission signal, a spreading unit 28 connected to the modulator/demodulator 27, a control bus control 30 connected to the modulator/demodulator 27, a monitor control unit 31, a 2 M/1.5 M interface unit 32, a base station control unit 33, and a timing supply unit 34.

Although FIG. 2 shows only the transmission system of the base station apparatus 20, the reception system also has a high-frequency amplifying section, frequency conversion section, demodulation section, de-spreading section, and the like (not shown). The base station apparatus 20 designates system control and a communication channel with respect to the mobile terminal 10 by using a perch channel. In accordance with this designation, the mobile terminal 10 measures a reception level and interference level and selects an optimal cell.

In such a conventional mobile communication system using the CDMA scheme, a single frequency is used for communication between a plurality of mobile terminals and a base station apparatus. To communicate with a maximum number of mobile terminals with a single frequency, the transmission power must be control to a minimum necessary power for each channel. On upstream channels from a plurality of mobile terminals to the base station apparatus, in particular, the distances from the respective mobile terminals to the base station apparatus differ from each other. In addition, the mobile terminals move. For these reasons, propagation losses change every moment. If the base station apparatus receives only a signal from a specific mobile terminal with high intensity, the signal interferes with other channels, resulting in a reduction in channel capacity.

For this reason, on upstream channels, high-speed power control is performed on the transmission power of mobile terminals to make each mobile terminal perform transmission with a minimum necessary power. In this upstream channel power control, the base station apparatus generally determines the upstream channel quality of each mobile terminal and transmits a transmission power control signal to each mobile terminal. In general, the quality of an upstream channel is determined on the basis of the ratio of the reception power of a signal from each mobile terminal which is received by the base station apparatus to the total reception power.

In such control, as the number of mobile terminals in communication increases, the total reception power at the base station apparatus increases. For this reason, sufficient communication quality cannot be obtained unless each mobile terminal performs transmission with a higher transmission power. If the number of terminals in communication further increases and an overload state is about to occur, the total reception power in the base station apparatus further increases. Therefore, each mobile terminal cannot ensure sufficient quality.

In this state, a mobile terminal located at a place where a high propagation loss occurs in propagation to the base station apparatus increases its transmission power to a maximum power with which transmission can be performed. In this case, satisfactory quality cannot be obtained on the upstream channel, and some mobile station may be disconnected. In addition, in a complete overload state, necessary upstream quality cannot be obtained in all mobile terminals, and the base station apparatus instructs each mobile terminal to increase the transmission power. Even if, however, mobile terminals increase their transmission powers to the maximum values, many mobile terminals cannot obtain necessary upstream channel quality and fail to communicate, resulting in abnormal disconnection.

In order to avoid such a state, the following method may be used. The error rate on an upstream channel from each mobile terminal in communication is monitored, and an overload state is determined when necessary channel quality cannot be obtained. At this time, connection of any other mobile terminals is inhibited. In a cellular system using CDMA, channel quality is generally controlled to set the frame error rate to one to several %. For this reason, a correct error rate cannot be calculated unless frame error rate measurement is performed over several hundred frames or more. In addition, since a general frame length is 10 ms to 20 ms, it takes several seconds or more for error rate measurement.

The above conventional method suffers the following problems.

First, it takes several seconds or more for frame error rate measurement, and an overload state may occur during the measurement.

Second, the frame error rate is increased by factors other than an overload state (e.g., a mobile terminal abruptly going underground or entering a tunnel), and hence it is difficult to correctly determine an overload state.

SUMMARY OF THE INVENTION

It is an object of the present invention to provide an upstream channel overload detection circuit which can easily detect the overload state of a base station apparatus with a simple arrangement without performing any complicated measurement called frame error rate measurement, and a base station apparatus.

In order to achieve the above object, according to the present invention, there is provided an upstream channel overload detection circuit for a CDMA (Code Division Multiple Access) mobile communication system, comprising reception electric field measurement means for detecting an electric field strength levels of reception signals from a plurality of mobile terminals, first storage means for storing an output from the reception electric field measurement means as a noise level when there is no transmission power of the plurality of mobile terminals, second storage means for storing, as a threshold level, an output from the reception electric field measurement means which corresponds to an allowable number of transmissions from the plurality of mobile terminals, and comparing means for comparing the electric field strength level output from the reception electric field measurement means with a sum value obtained by adding the noise level stored in the first storage means to the threshold level stored in the second storage means.

DESCRIPTION OF THE PREFERRED EMBODIMENT

The present invention will be described in detail below with reference to the accompanying drawings.

According to CDMA, a single carrier frequency is used for a plurality of communications, and the carrier is spectrum-spread by a unique spreading code assigned from each mobile terminal. A mobile terminal detects a wideband carrier from many mobile terminals, and despreads the carrier by multiplying it by spreading codes, thereby receiving data from the corresponding mobile terminals in accordance with paths corresponding to the correlation degrees.

Figure 1:
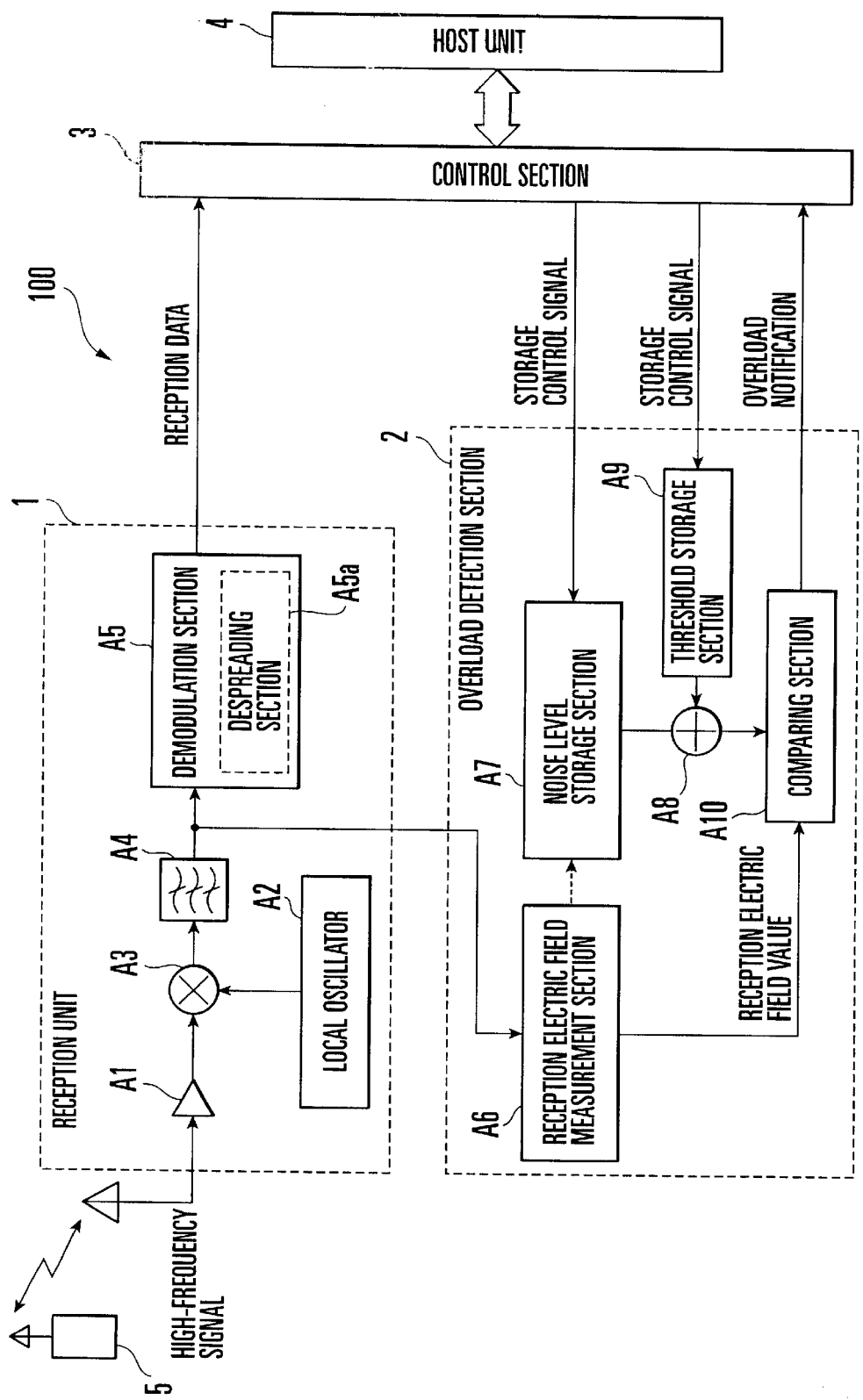
FIG. 1 is a block diagram showing a base station apparatus forming a CDMA mobile communication system according to an embodiment of the present invention.
Figure 2:
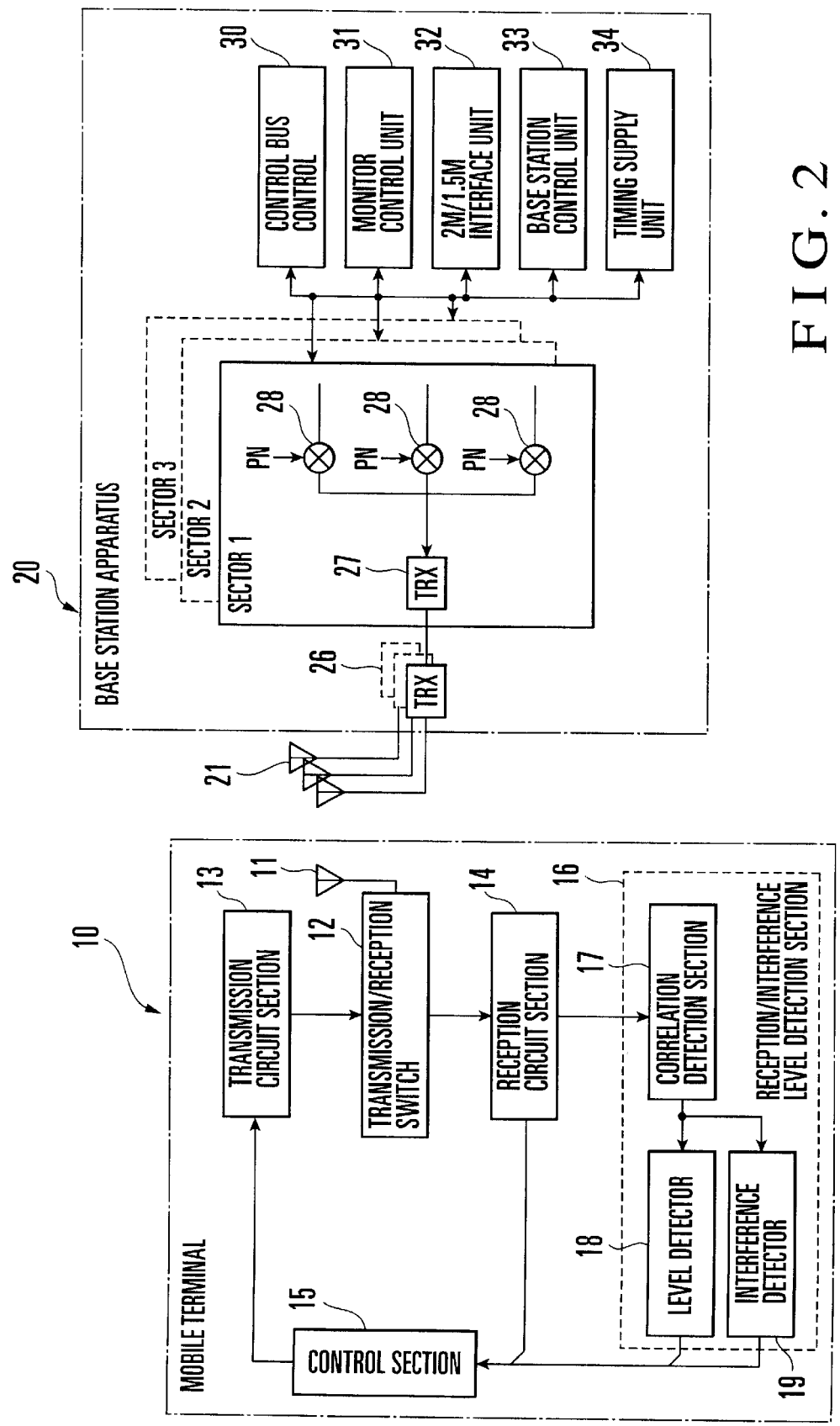
FIG. 2 is a block diagram showing a base station apparatus and mobile terminal which form a conventional CDMA mobile communication system.

FIG. 1 shows a CDMA base station apparatus according to an embodiment of the present invention. Referring to FIG. 1, a base station apparatus 100 is comprised of a reception unit 1 for receiving signals from a plurality of mobile terminals 5, an overload detection section 2 for receiving an output from the reception unit 1, and a control section 3 which controls the reception unit 1 and overload detection section 2 and is connected to the host unit 4. The base station apparatus 100 includes reception units 1 larger in number than mobile stations.

In the reception unit 1, a high-frequency amplifying section A1 amplifies a CDMA high-frequency signal from the mobile terminal 5, which is input to the base station apparatus 100. A mixer section A3 multiplies the input high-frequency signal by a signal from a local oscillator A2 to convert the high-frequency signal into an intermediate-frequency signal. The local oscillator A2 generates a local oscillation carrier signal required for frequency conversion performed by the mixer section A3. A band-limiting filter A4 passes only a signal, of intermediate-frequency signals from the mixer section A3, which falls in a band required for communication.

A demodulation section A5 demodulates the intermediate-frequency signal output from the band-limiting filter A4, and outputs reception data based on a baseband signal. In demodulating the signal, a despreading section A5a of the demodulation section A5 performs despreading by multiplying the spreading code assigned to the mobile terminal 5 and the baseband signal.

In the overload detection section 2, a reception electric field measurement section A6 measures the power of an intermediate-frequency signal. This power measurement may be performed by envelope detection or delay detection; an analog signal or digital signal is detected and output. A noise level storage section A7 stores a value output from the reception electric field measurement section A6 without any load, and outputs it. A threshold storage section A9 stores a threshold that defines a specific load state determined as an overload, and outputs the corresponding value. An adding section A8 adds the noise level value output from the noise level storage section A7 to the threshold output from the threshold storage section A9, and outputs the resultant value.

A comparing section A10 compares the current reception electric field value output from the reception electric field measurement section A6 with the reception power threshold output from the adding section A8. In this case, if the current reception electric field value is larger, an overload notification is output. If the current reception electric field value becomes smaller than the threshold, the overload notification is canceled. The control section 3 relays the reception data output from the demodulation section A5 and the overload notification/cancellation notification output from the comparing section A10 to the host unit 4. The control section 3 sends an instruction to receive a noise level to the noise level storage section A7, and sets a threshold for determining an overload state in the threshold storage section A9.

In this embodiment, an upstream channel overload detection circuit is presented. For example, according to a system based on the international standard IS-95B in the U.S. data communication is supported on the assumption that the system is used in a state where upstream and downstream data rates differ from each other. In general, the amount of data on a downstream channel is larger than that on an upstream channel. However, for example, when a user wants to send a large amount of data, the amount of data on the upstream channel may become larger. In such a case, in an IS-95B system, a channel dedicated to data communication called a "supplemental channel" is used to transmit data.

IS-95B defines that a maximum of seven supplemental channels can be used for this upstream channel. That is, if several terminals simultaneously transmit high-speed data over an upstream channel, the channel immediately becomes overloaded. As in this embodiment, therefore, an upstream channel overload detection circuit becomes important.

It is generally known that whether a given channel in CDMA is overloaded or not can be determined by equation (1) given below.

$$\text{load } (\%) = (1 - [\text{reception power without load}]/[\text{current total reception power}]) \times 100 \quad (1)$$

On the basis of this theory, the overload detection section 2 of the present invention receives a reception signal from the reception unit 1 of the base station apparatus 100, measures a reception power value, and recognizes an overload state by comparing the reception power value without load and the current total reception power value.

The base station apparatus 100 detects the overload state of the self-cell and notifies the host unit 4 of the corresponding information. This makes it possible to restrict originating/terminating operation, hard handoff to another frequency, or the like by using the host unit 4 before the mobile terminal 5 in communication in the self-cell is seriously affected by the overload.

The operation of the base station apparatus 100 having this arrangement will be described next.

The radio wave transmitted from the mobile terminal 5 is received by the reception unit 1. The radio wave received by the reception unit 1 is amplified by the high-frequency amplifying section A1, and frequency-converted into an intermediate-frequency signal by the mixer section A3. The resultant signal is filtered by the band-limiting filter A4 to obtain only an intermediate-frequency signal in the necessary band. The relative carrier levels of signals transmitted from a plurality of mobile terminals 5 over a single frequency carrier can be detected. The demodulation section A5 demodulates the intermediate-frequency signal output from the band-limiting filter A4, and obtains reception data despread with a spreading code. The reception data is sent to the host unit 4 through the control section 3.

The host unit 4 detects a transmission path from each mobile terminal 5 and specifies the mobile terminal 5 corresponding to the spreading code. That is, correlations are calculated by using spreading codes matched to the spreading codes from the respective mobile terminals 5, and the mobile terminal 5 corresponding to the spreading code exhibiting the maximum correlation is specified, thereby allowing communication with the mobile terminal 5. In addition, the host unit 4 searches for the telephone number of a distant telephone set or the address of a distant mobile terminal which is designated by the mobile terminal 5 by using a public telephone network, ISDN (Integrated Service Digital Network), Internet, or the like and outputs an incoming call, thereby allowing data communication with the mobile terminal 5.

The intermediate-frequency signal output from the band-limiting filter A4 is also input to the overload detection section 2. The reception electric field measurement section A6 measures a reception electric field strength from the input intermediate-frequency signal, and outputs the resultant data to the comparing section A10.

The noise level storage section A7 stores the reception electric field measured by the reception electric field measurement section A6 in a state with no load as the noise level of the corresponding receiver. The state with no load is a state where no reception data from the demodulation section A5 cannot be detected regardless of an intermediate-frequency signal level. Reception data in this case is airborne radio wave noise like white noise. The threshold storage section A9 stores the difference between a reception electric field defined as an overload and a noise level in advance.

The reception electric field defined as an overload is a reception electric field in a case where all the mobile terminals 5 of the number (capacity) allowed by the base station apparatus simultaneously transmit signals to the base station apparatus. In addition, when signals are transmitted from mobile terminals 5 arranged randomly in terms of distance in an area near the base station apparatus or zone area, a reception electric field strength corresponding to the allowable number of mobile terminals is set as a threshold.

The adding section A8 adds the noise level output from the noise level storage section A7 to the threshold output from the threshold storage section A9, and outputs the resultant data to the comparing section A10. The comparing section A10 compares the current reception electric field output from the reception electric field measurement section A6 with the sum value output from the adding section A8. If the current reception electric field value is larger than the overload threshold, the comparing section A10 sends an overload notification to the control section 3. Upon reception of the overload notification, the control section 3 transfers it to the host unit 4, thereby restricting originating/terminating operation. Note that the control section 3 may disable a communication request from the mobile terminal 5.

When a small number of mobile terminals 5 transmit signals near the antenna of the base station apparatus, there is no possibility in CDMA that the reception electric field based on the base station apparatus increases, and the electric field measurement result obtained by the reception electric field measurement section A6 also increases, resulting determination of an overload. That is, the base station apparatus and mobile terminal 5 have the function of mutually controlling transmission power, and the mobile terminals 5 near the antenna of the base station apparatus mutually control transmission power by message control or the like to manage transmission with a low transmission power. There is no possibility that the reception electric field strength is abnormally increased by one mobile terminal 5 near the antenna. This is because, the transmission power of a unique mobile terminal 5 is specified by the base station apparatus using a unique spreading code, and the specified mobile terminal 5 is notified of an excess or shortage of transmission power, thus performing control.

The manner in which an overload state is determined will be described next. In CDMA, when an upstream channel overload occurs, the corresponding cell goes dead. This will be described in detail below. In a CDMA system, all terminals perform communication with a single frequency. That is, communication must be performed with a plurality of mobile terminals 5 located at different distances (different propagation losses) from the base station. Even in CDMA, if a signal from a given mobile terminal 5 is very high in electric field strength than the remaining mobile terminals 5, signals from the remaining mobile terminals 5 cannot be received in the corresponding cell. This phenomenon will be further described theoretically. When a reception signal is despread in the base station apparatus, if the ratio of the energy of a signal required for data communication to noise is sufficient, communication can be performed. The ratio of the energy of this signal to noise is often represented by $E_B/N_O$ or the like.

According to the above description, one mobile terminal 5 transmits a signal with a very high intensity. In actual CDMA, however, high-speed transmission power control is performed to allow the base station apparatus to receive upstream signals from the respective mobile terminals 5 with maximum uniformity. That is, by making all the mobile terminals 5 perform minimum necessary transmission to maximize the number of mobile terminals 5 that can perform communication with one frequency.

Even in this case, not infinite number of mobile terminals 5 can perform communication with one radio frequency. If the sum of signals from the mobile terminals 5 becomes very large, a sufficient ratio of the energy of a signal to noise cannot be obtained as the number of mobile terminals 5 increases. Even if signals from other mobile terminals 5 are despread, they do not become 0 but remain as energy, and a spread gain can be obtained for only a desired signal. If, however, signals from other mobile terminals 5 are large in intensity, they cannot be demodulated. This is a dangerous state for the base station.

The base station monitors the ratio $E_B/N_O$ of signal energy to noise, and transmits a transmission power control signal to the mobile terminal 5. Each mobile terminal 5 performs transmission power control in accordance with this control signal. If, however, the above state occurs, the target ratio $E_B/N_O$ of signal energy to noise cannot be obtained from signals from any mobile terminals, and the base station apparatus outputs an instruction to increase transmission power to all the mobile terminals 5.

In response to this instruction, each mobile terminal 5 increases the transmission power. However, since the remaining mobile terminals 5 simultaneously increase the transmission power, the mutual interference level increases. As a consequence, the target ratio of signal energy to noise cannot be obtained. For this reason, the base station instructs the mobile terminal 5 to increase the transmission power, and the mobile terminal 5 enters a loop of increasing transmission power, and cannot perform communication in the corresponding cell. Finally, the mobile terminals 5 that cannot increase the transmission power are sequentially subjected to abnormal disconnection. This state is a state where "the corresponding cell goes dead", i.e., the cell is overloaded.

Although in the above embodiment, a scheme of determining a noise level is not described in detail, a nose level can be determined by connecting a dummy load to an antenna terminal and performing measurement. The load of this cell is defined as 0% when no signal is input to the base station. Therefore, noise levels vary depending on the place where the base station is installed. To detect an upstream channel overload state, the position of the base station is an important parameter in addition to a threshold.

When an antenna is connected, even if there is no mobile terminal 5 in communication or an interfering radio wave other than a CDMA radio wave is received, the load of the corresponding cell increases. For this reason, an overload state is determined by comparing the threshold obtained by adding a noise level measured in advance with an electric field level corresponding to the position of the base station.

The above embodiment has exemplified the case where one cell is not divided into sectors. However, the present invention can be equally applied to a case where one cell is divided into a plurality of sectors. More specifically, when one base station covers three sectors and two-branch reception diversity is performed per sector, one base station includes six receivers. In this arrangement, when one receiver becomes overloaded, an overload is not determined in the overall base station, and overload management is performed for each sector. If one receiver in one sector is set in an overload state, the sector that covers the receiver in the overload state may be determined as an overloaded sector, and no call may be assigned to this sector.

Note that overload detection circuits equal in number to the receivers in the base station apparatus may be provided. Alternatively, the overload states of a plurality of receivers may be time-divisionally detected by an overload detection circuit common to a cell or sector.

According to the present invention, by detecting a load state before an overload state occurs, the load of a cell can be controlled by, for example, assigning no call to the cell, in accordance with the load state. This can prevent a mobile terminal in speech communication in a cell managed by the base station apparatus from being disconnected when the cell become overloaded.

A mobile terminal that is barely performing communication in an overloaded cell is transmitting a signal with a transmission power close to the maximum power, and hence may interfere with an upstream channel in an adjacent cell. According to the present invention, however, control on a load state prevents a cell from becoming overloaded, and hence can reduce interference given by the mobile terminal in communication in the cell to an upstream channel in another cell.

In the scheme of monitoring the error rates on all upstream channels in use to detect a load state, the number of channels to be monitored is large, and the monitoring unit becomes complicated. In addition, an error rate varies due to a factor other than a load state. For this reason, a load state cannot be accurately determined. According to the present invention, since only a reception electric field is monitored, the arrangement is simple, and a load state can be accurately calculated from a reception level. This makes it possible to easily and accurately implement the function of detecting a load state.

What is claimed is:

1. An upstream channel overload detection circuit for a CDMA (Code Division Multiple Access) mobile communication system, comprising:

an electric field measurement means for detecting, in a base station, electric field strength levels of reception signals from a plurality of mobile terminals and for outputting the strength levels and for outputting a base station noise level value that represents a noise level when there is no transmission power from the plurality of mobile terminals;

a first storage means for storing the base station noise level value output from the electric field measurement means;

a second storage means for storing a threshold level value which corresponds to an allowable number of transmissions from the plurality of mobile terminals;

a comparing means for comparing the strength levels from the electric field measurement means with a sum value obtained by adding the base station noise level value from the first storage means to the threshold level value from the second storage means; and wherein the comparing means determines an occurrence of an upstream channel overload based on the strength levels, the base station noise level value, and the threshold level value.

2. The circuit according to claim 1, wherein the comparing means determines the occurrence of an upstream channel overload if the sum value is smaller than the strength levels.

3. The circuit according to claim 1, wherein said comparing means determines an overload when a load ratio representing a ratio of the strength levels to the base station noise level value is not less than a predetermined value.

4. The circuit according to claim 1, comprising:
a high-frequency means for receiving transmission powers from the plurality of mobile terminals and for outputting corresponding high-frequency signals;
a mixer means for converting the high-frequency signals into intermediate-frequency signals; and
a filter means for filtering the intermediate-frequency signals to output the reception signals to the electric field measurement means.

5. The circuit according to claim 4, wherein the circuit further comprises:
a demodulation means for demodulating the intermediate-frequency signals output from said filter means; and
a despreading means for despreading a demodulated output from said demodulation means with a spreading code, and
wherein a mobile terminal of the plurality of mobile terminals which corresponds to the spreading code is specified by detecting transmission paths from the plurality of mobile terminals by using an output from said despreading means.

6. A base station apparatus in a CDMA (Code Division Multiple Access) mobile communication system, comprising:
a high-frequency means for receiving transmission powers from a plurality of mobile terminals and for outputting corresponding high-frequency signals;
a mixer means for converting the high-frequency signals into intermediate-frequency signals;
a filter means for filtering the intermediate-frequency signals to output filtered reception signals;
an electric field measurement means for detecting electric field strength levels of the filtered reception signals and for outputting a base station noise level value which represents a noise level in a state where there is no transmission power from the plurality of mobile terminals;
a first storage means for storing the base station noise level value;
a second storage means for storing a threshold level value which corresponds to an allowable number of transmissions from the plurality of mobile terminals;
a comparing means for comparing the electric field strength levels with a sum value obtained by adding the base station noise level value stored in the first storage means to the threshold level value stored in the second storage means;
a demodulation means coupled to the filter means for demodulating the filtered reception signals and for outputting reception data; and
a control means for relaying the reception data and an output from the comparing means to a host unit,
wherein the host unit restricts a number of transmission channels for the plurality of mobile terminals in accordance with an overload notification from the control means.

7. The apparatus according to claim 6, wherein said control means performs control to inhibit communication upon reception of a communication request from one of said plurality of mobile terminals in accordance with an output from said comparing means.

8. An upstream channel overload detection circuit for a CDMA (Code Division Multiple Access) mobile communication system, comprising:
an electric field measurement circuit that detects, in a base station, electric field strength levels of reception signals from a plurality of mobile terminals and that outputs the strength levels and a base station noise level value that represents a noise level in a state where there is no transmission power from the plurality of mobile terminals;
a first storage portion that stores the base station noise level value;
a second storage portion that stores a threshold level value which corresponds to an allowable number of transmissions from the plurality of mobile terminals;
a comparing circuit that compares the strength levels output from the electric field measurement circuit with a sum value obtained by adding the base station noise level value from the first storage portion to the threshold level value from the second storage portion; and
wherein the comparing circuit determines an occurrence of an upstream channel overload based on the strength levels, the base station noise level value, and the threshold level value.

9. A base station apparatus in a CDMA (Code Division Multiple Access) mobile communication system, comprising:
a high-frequency section that receives transmission powers from a plurality of mobile terminals and that outputs a high-frequency signal;
a mixer circuit that converts the high-frequency signal into an intermediate-frequency signal;
a filter circuit that filters the intermediate-frequency signal to output a filtered signal;
an electric field measurement circuit that detects an electric field strength level of the filtered signal and that outputs the strength level and a base station noise level value, where the base station noise level value represents a noise level in a state when there is no transmission power from the plurality of mobile terminals;
a first storage section that stores the base station noise level value;
a second storage section that stores a threshold level value which corresponds to an allowable number of transmissions from the plurality of mobile terminals;
a comparing circuit that compares the strength level output from the electric field measurement circuit with a sum value obtained by adding the base station noise level value to the threshold level value;
a demodulation circuit that demodulates the filtered signal and outputs reception data; and
a control circuit that relays the reception data and an output from the comparing circuit to a host unit,
wherein the host unit restricts a number of transmission channels from the plurality of mobile terminals in accordance with an overload notification from said control circuit.

* * * * *